(No Model.) 2 Sheets—Sheet 1.
E. W. FULLER.
ROLLER CHUTE.
No. 536,074. Patented Mar. 19, 1895.
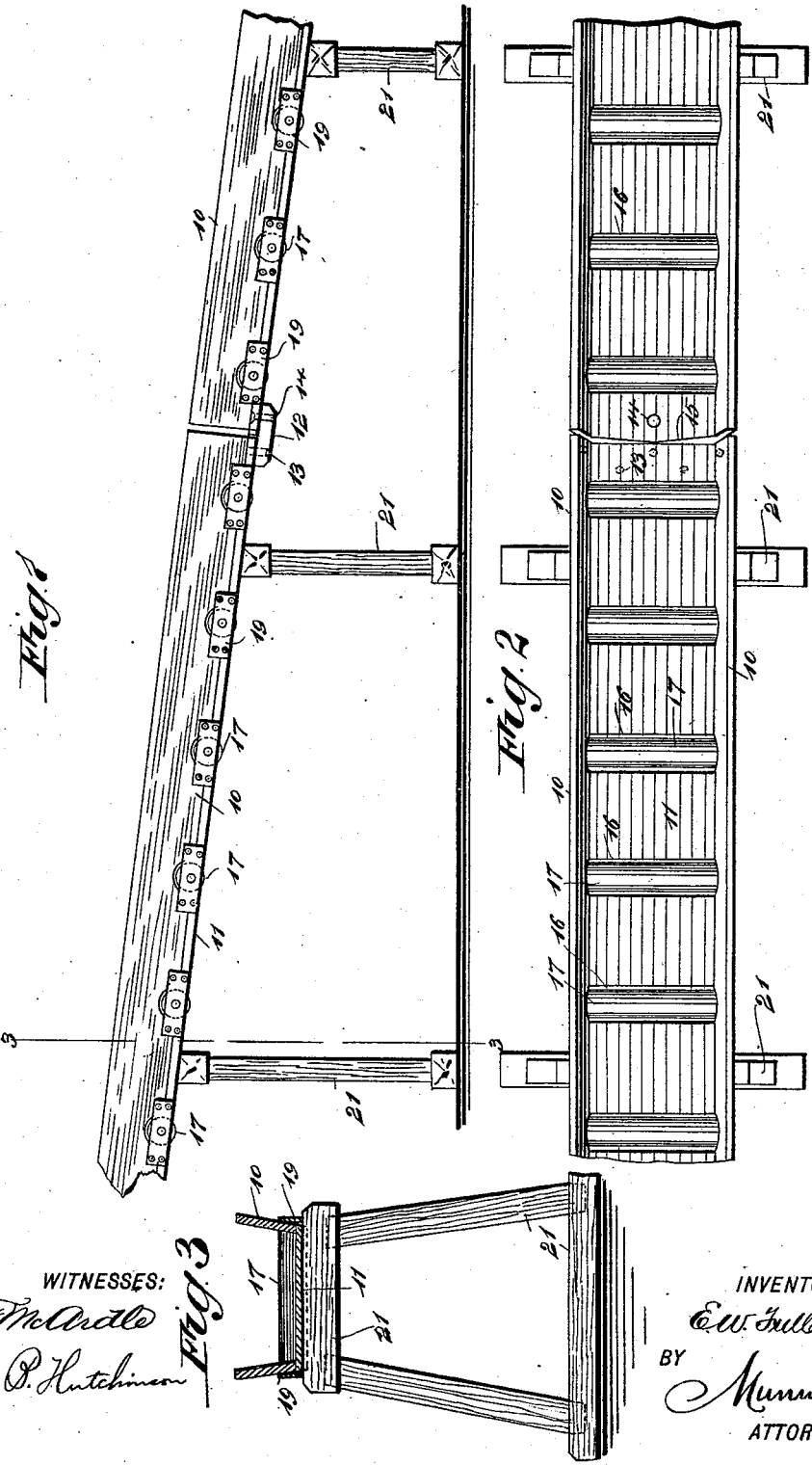

(No Model.) 2 Sheets—Sheet 2.

E. W. FULLER.
ROLLER CHUTE.

No. 536,074. Patented Mar. 19, 1895.

WITNESSES:
F. McArdle
N. P. Hutchinson

INVENTOR
E. W. Fuller
BY
Munn & Co.
ATTORNEYS.

UNITED STATES PATENT OFFICE.

EDWIN W. FULLER, OF PAHALAR, HAWAII.

ROLLER-CHUTE.

SPECIFICATION forming part of Letters Patent No. 536,074, dated March 19, 1895.

Application filed August 4, 1894. Serial No. 519,504. (No model.)

*To all whom it may concern:*

Be it known that I, EDWIN WALCOTT FULLER, of Pahalar, Kau, Hawaiian Islands, have invented a new and Improved Roller-Chute, of which the following is a full, clear, and exact description.

My invention relates to improvements in roller chutes such as are adapted for use on grades to convey sugar-cane, lumber, firewood and other materials; and the object of my invention is produce a simple and inexpensive chute which may be easily erected, may be adjusted to varying curves, is very strong, and is built in such a manner that the various materials thrown into it will be carried forward and downward by gravity and with little friction.

A further object of my invention is to construct and arrange the rollers in the chute in such a manner that they will be very durable, and may be readily hung in place and easily removed when repairs are necessary.

To these ends my invention consists of certain features of construction and combinations of parts, which will be hereinafter described and claimed.

Reference is to be had to the acccompanying drawings, forming a part of this specification, in which similar figures of reference indicate corresponding parts in all the views.

Figure 4:
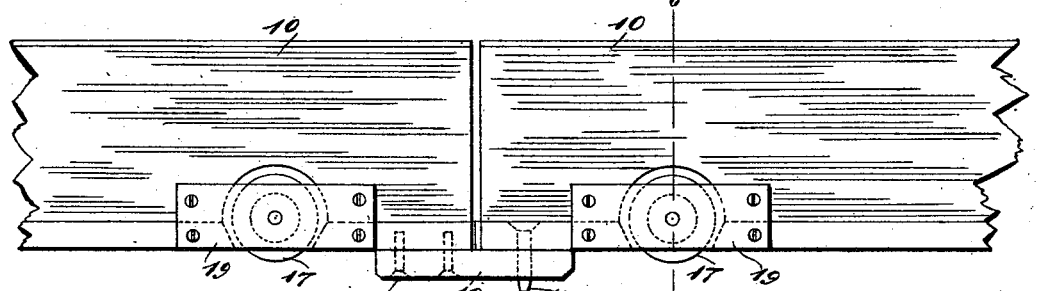
Figure 5:
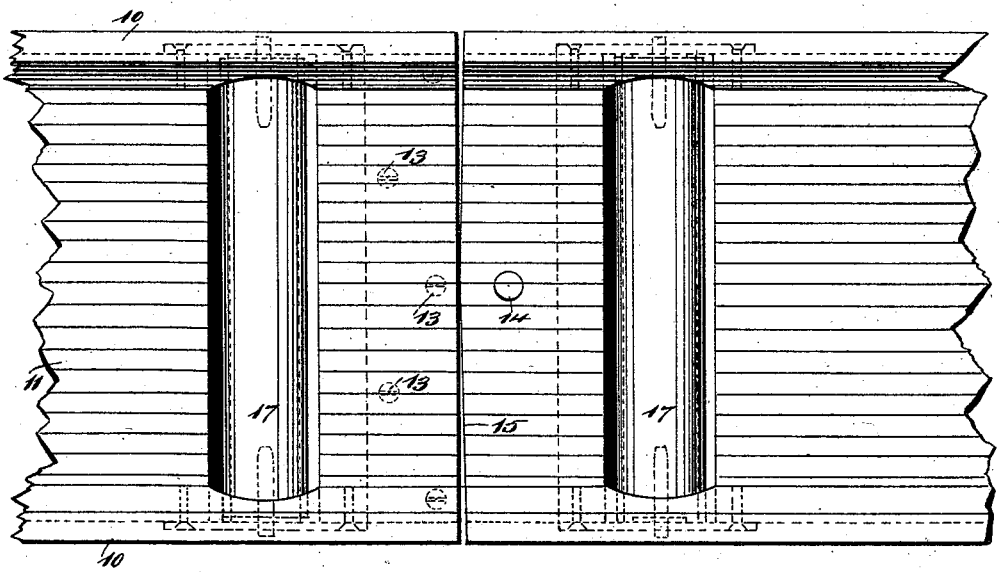
Figure 6:
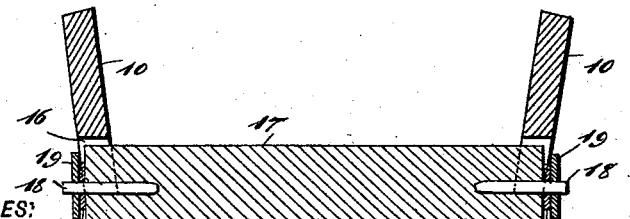

Figure 1 is a broken side elevation of the chute embodying my invention. Fig. 2 is a plan view of the same. Fig. 3 is a vertical cross section on the line 3—3 of Fig. 1. Fig. 4 is an enlarged detail side elevation, showing the manner in which abutting sections of the chute are fastened together. Fig. 5 is a plan view of the construction shown in Fig. 4; and Fig. 6 is a cross section on the line 6—6 of Fig. 4.

The chute is made up of a series of sections in order that it may be easily transported and set up, and also to facilitate its adjustment around curves, each section being troughlike and consisting of the raised sides 10 and the flat bottom 11. The sections are united by fish plates 12, each plate being rigidly secured to the under side of one section, as shown at 13, so as to project beyond the end of the said section and overlap the adjacent section to which it is secured by a large center pin or bolt 14 which is countersunk in the bottom of the section to which it is attached, and this pin serves as a pivot to enable the sections to be adjusted so as to round a curve, and to further facilitate this one end of each section is tapered from the center to the edges, as shown clearly in Figs. 2 and 5.

At intervals in the bottom of the chute are transverse openings 16, in which are held rollers 17 which extend the full width of the chute, and the top surfaces of which are slightly above the chute bottom, so that material thrown into the chute will ride on the rollers and so slide easily down the chute. The rollers have end trunnions 18 which, as illustrated, consist of pins driven into the ends of the rollers, and these are held in bearing plates 19 which are firmly bolted to the sides of the chute opposite the ends of the openings 16, and to prevent excessive friction washers 20 are placed on the trunnions between the ends of the rollers and the bearing plates 19.

It will of course be understood that the trunnions may be made integral with the rollers if preferred, and that any approved kind of rollers may be used without departing from the principle of my invention. The rollers may be placed any necessary distance apart, this depending of course somewhat on the nature of the material to be conveyed by the chute.

The chute may be supported in any convenient way, but where natural supports are not available trestles 21 may be advantageously employed. The chute may also be given any necessary inclination, this too depending on the nature of the material to be conveyed.

Having thus described my invention, I claim as new and desire to secure by Letters Patent—

A roller chute consisting in a series of sections pivotally connected at their adjacent ends to have a limited lateral movement and each section having transverse openings extending entirely across and through its bottom and opposite side walls, rollers mounted in said bottom and side openings and plates 19 in which the rollers are journaled, said plates being removably bolted to the outer
5 faces of the sides of the chute and crossing the roller openings therein, whereby upon removing one or both of any pair of plates any individual roller may be removed without disturbing the others, substantially as described.

EDWIN W. FULLER.

Witnesses:
R. ZIEGLER,
J. S. EMERSON.